Feb. 13, 1962  D. PERLMAN  3,021,262
PREPARATION OF COBALAMINS
Filed Dec. 11, 1958
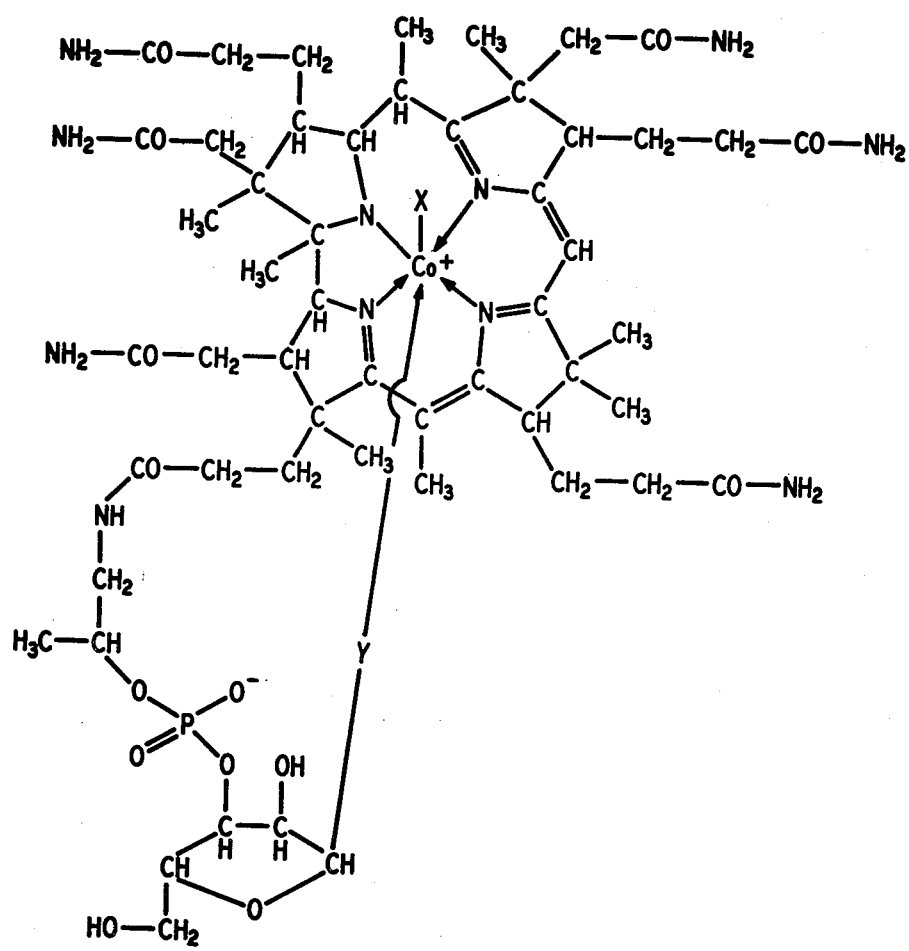
DAVID PERLMAN, Inventor

United States Patent Office

3,021,262
Patented Feb. 13, 1962

3,021,262
PREPARATION OF COBALAMINS
David Perlman, Princeton, N.J., assignor to Olin Mathieson Chemical Corporation, New York, N. Y., a corporation of Virginia
Filed Dec. 11, 1958, Ser. No. 780,181
14 Claims. (Cl. 195—96)

This application is a continuation-in-part of application Serial No. 642,087, filed February 25, 1957, and now abandoned.

This invention relates to an improved process for preparing physiologically active cobalamins.

Prior to this invention, it was known that physiologically active cobalamins could be prepared biosynthetically by culturing certain microorganisms in a cobalt-containing nutrient medium. When the nourmal culture medium components failed to provide adequate utilizable cobalt, additional cobalt, generally in the form of a salt, had to be added to the nutrient medium either before or during the incubation period. Since cobalt is known to have high toxicity to microorganisms, care had to be taken in such a process to assure that the concentration of cobalt in the medium was below its toxic level so as to prevent any adverse effect on the growth and metabolism of the microorganism. In order to prevent this possibility, therefore, the cobalt was added to the medium in low concentration, which often resulted in an insufficiency of cobalt and, hence, a failure to fully convert all utilizable metabolites to the desired cobalamin.

It is the object of this invention, therefore, to provide an improved process for the preparation of physiologically active cobalamins which is more efficient and less critical than those previously known.

These objects are achieved by the process of this invention, which essentially comprises culturing a vitamin $B_{12}$-producing microorganism in a cobalt deficient nutrient medium, separating the cells from the medium, treating the separated cells with a utilizable source of cobalt, aerating the resulting cellular suspension and recovering the resulting physiologically active cobalamin. [By "cobalt deficient" is meant, of course, a cobalt content (if any) insufficient for maximum cobalamin production.]

Among the microorganisms which may be employed in the practice of this invention are those known to produce vitamin $B_{12}$. These include microorganisms which are known to form vitamin $B_{12}$ without added precursor, such as Streptomyces griseus, Streptomyces aureofaciens, Streptomyces albidoflavus, Streptomyces, antibioticus, Streptomyces colombiensis, Streptomyces fradiae, Streptomyces roseochromogenus, Streptomyces olivaceus, Propionibacterium freudenreichii, Aerobacter areogenes, Ashbya gossypii, Mycobacterium phlei, Mycobacterium smegmatis and Mycobacterium tuberculosis, as well as microorganisms which are known to form vitamin $B_{12}$ only in a nutrient medium in which has been included a 5,6-dimethylbenzimidazole, as exemplified by Propionibacterium arabionosum, Propionibacterium pentosaceum, Propionibacterium zeae, Propionibacterium thoenii, Propionibacterium rubrum, Propionibacterium petersonii, Bacillus megaterium, Bacillus subtilis, Clostridium butyricum, Clostridium cochlearium, Clostridium flabelliferum, Clostridium tetanomorphum and Escherichia coli. If an added precursor-requiring micoorganism is used, the precursor can either be added directly to the nutrient medium or later to the separated cells, as more fully described in my application Serial No. 635,299, filed January 22, 1957. [By the term "precursor" is meant a chemical substance which is utilized by the cobalamin-forming microorganism in the biosynethesis of the base of the nucleotide of the cobalamin and may be exemplified by 5,6-dimethylbenzimidazole, which is a precursor for vitamin $B_{12}$.] Furthermore, the use of an added precursor-requiring microorganism affords a process whereby unnatural physiologically active cobalamins can be prepared, this modification of process being more fully detailed hereinafter.

The nutrient media useful in the first step of the process of this invention include the usual sources of assimilable carbon and nitrogen. As sources of assimilable carbon, there may be used: (1) carbohydrates, such as glucose, fructose, sucrose, maltose, dextrins and soluble starches; (2) substances containing carbohydrates, such as corn steep liquor and grain mashes; (3) polyhydric alcohols, such as glycerol; (4) fats, such as lard oil, soybean oil, linseed oil, cottonseed oil, peanut oil, coconut oil, corn oil, castor oil, sesame oil, palm oil, mutton tallow, sperm oil, olive oil, tristearin, triolein and tripalmitin; and (5) fatty acids having more than 14 carbon atoms, such as stearic acid, palmitic acid, oleic acid, linoleic acid and myristic acid.

Sources of available nitrogen include: (1) organic nitrogen compounds, such as proteinaceous materials, e.g. soybean meal, fish meal, casein, whey or whey concentrates, yeast, amino acids and liver cake; and (2) inorganic compounds, such as nitrates or ammonium compounds.

The cobalt-deficient nutrient media may, of course, contain any of the additional components usually found in such solutions; among these additional components are antifoam agents (e.g., lard oil, octadecanol, etc.), metallic cations, such as potassium, calcium, magnesium and iron (which may be present in the crude materials used in the nutrient medium), and phosphates (which may be added as inorganic phosphate).

The fermentation process may be carried out at temperatures from about 20° C. to about 40° C. If the microorganism is one which grows under aerobic conditions, a source of oxygen or air should also be present. This aeration can be accomplished by bubbling air (or oxygen) through the medium during the fermentation or by agitating the medium, thereby exposing a large surface thereof to the atmosphere. If the microorganism is anaerobic in nature, of course, this aeration step must then be omitted.

After a sufficient incubation time (about one to ten days), the medium is separated into its liquid and solid components, as by filtration or centrifugation; and the cells are suspended in water (preferably distilled water). This suspension can then, if desired, be again separated into its solid and liquid portions and the solid component resuspended in water. The optimal pH of the finally adjusted suspension is one in the range of about 5 to about 8.

To the suspension is added at least the stoichiometrically required amount of cobalt to yield the desired cobalamin. Unlike priorly known processes, an excess of cobalt need not be avoided, so that the upper limit of permissible cobalt is not critical. This cobalt is added in the form of any utilizable source of cobalt, preferably in the form of an inorganic cobalt salt (e.g., cobalt nitrate, cobalt chloride). The temperature of the suspension during this addition is not critical and can be anywhere in the range of about 10° C. to about 40° C. but preferably, for ease in handling, is at ambient temperature.

The resulting cellular suspension is then aerated in order to produce the desired physiologically active cobalamin. The aeration can be accomplished in any suitable manner, as for example, by bubbling air (or oxygen) through the suspension or by agitating the suspension, thus exposing a larger surface thereof to the atmosphere.

It has been found that this aeration step is essential for the production of the cobalamine, no significant activity being observed prior thereto.

The thus-treated cellular suspension is then heated (e.g., to a temperature in the range of about 70° C. to about 100° C.), or acidified (as disclosed in Patent No. 2,656,300 of McCormack et al., granted October 20, 1953), or disrupted by treatment with supersonic energy to release the cobalamin from the cells, and then filtered or centrifuged, and the cobalamin recovered from the liquid portion. As an alternative procedure, the cells are first separated from the liquid and then lysed, as by treatment with a solvent such as acetone or n-propanol.

The recovery step can be further modified by concentrating the cellular suspension, after treatment with cobalt and aeration and before release of the cobalamin from the cells, as by centrifuging; the supernatant fluid (which contains only a small amount of the cobalamin) is discarded, and the concentrated cellular suspension is then heated, acidified or disrupted as described hereinbefore to release the cobalamin from the cells.

Furthermore, if an animal feed supplement is desired, the treated cellular suspension may be dried and incorporated directly into animal feeds.

If an added precursor-requiring microorganism is employed, the precursor can be added either directly to the nutrient medium, or to the cell suspension. The nature of the precursor employed depends on the physiologically active cobalamin desired. Thus, if vitamin $B_{12}$ is desired, 5,6-dimethylbenzimidazole or another vitamin $B_{12}$ precursor, such as 2,3-dimethyl-5,6-diaminobenzene, 2,3-dinitro-5,6-dimethylbenzene or 2,3-dimethyl-4-amino-5-nitrobenzene, may be used. If an "unnatural vitamin $B_{12}$" which possesses vitamin $B_{12}$-like activity is desired, a precursor for the particular cobalamin can be used. Thus, as summarized in the following table, the nature of the resulting cobalamin will depend on the precursor chosen; and since this choice is independent of the first fermentation step, this aspect of the process of this invention affords a method whereby a variety of cobalamins can be produced from the product of a single fermentation procedure. In this table, the symbol Y is that in accompanying drawing:

| Precursor | Product (Y-cobalamins) | |
|---|---|---|
| | Name | Y is — |
| 5,6-Dimethylbenzimidazole. 2,3-Dimethyl-5,6-diaminobenzene. 2,3-Dinitro-5,6-dimethylbenzene. 2,3-Dimethyl-4-amino-5-nitrobenzene. | 5,6-Dimethyl-benzimidazole-cobalamin. | [structure] |
| Benzimidazole. 1,2-Diaminobenzene. 1,2-Dinitrobenzene. 1-Amino-2-nitrobenzene. | Benzimidazole-cobalamin. | [structure] |
| 2-Nitro-4-trifluoromethylaniline. 5-Trifluoromethylbenzimidazole. 4-Trifluoromethylphenylene-diamine-1,2. | 5-Trifluoromethyl-benzimidazole-cobalamin. | [structure] |
| 4-Bromo-6-methoxybenzimidazole. 3-Bromo-5-methoxyphenylene-diamine-1,2. | 4-bromo-6-methoxy-benzimidazole cobalamin. | [structure] |
| Quinazoline | Quinazoline-cobalamin. | [structure] |
| 4(3H)-quinazolinone. | 3,4-Dihydro-4-oxoquinazoline-cobalamin. | [structure] |
| 2,4-Dichloroquinazoline. | 2,4-Dichloro-quinazoline-cobalamin. | [structure] |
| 4-Chloro-8-nitroquinazoline. | 4-Chloro-8-nitro-quinazoline-cobalamin. | [structure] |
| 2(1),4(3)-Quinazolinedione. | 1,2,3,4-Tetrahydro-2,4-dioxoquinazoline-cobalamin. | [structure] |
| 8-Amino-4-methoxy-quinazoline. | 8-Amino-4-methoxy-quinazoline-cobalamin. | [structure] |
| 2-Methyl-4-methyl-thioquinazoline. | 2-Methyl-4-methyl-thio-quinazoline-cobalamin. | [structure] |
| Phenazine | Phenazine-cobalamin. | [structure] |
| 2-Nitrophenazine | 2-Nitrophenazine-cobalamin. | [structure] |
| 2-Aminophenazine | 2-Aminophenazine-cobalamin. | [structure] |
| 1-Amino-2-hydroxyphenazine. | 1-amino-2-hydroxy-phenazine-cobalamin. | [structure] |

| Precursor | Product (Y-cobalamins) | |
|---|---|---|
| | Name | Y is — |
| 1-Acetamido-3-methoxyphenazine. | 1-Acetamido-3-methoxyphenazine-cobalamin. | (structure: phenazine with NH₂COCH₃ and OCH₃ substituents) |
| 2-Hydroxyphenazine. | 2-Hydroxyphenazine-cobalamin. | (structure: phenazine with OH substituent) |
| 5-Methylbenzimidazole. | 5-Methylbenzimidazole-cobalamin. | (structure: 5-methylbenzimidazole) |
| Quinoxaline. | Quinoxaline-cobalamin. | (structure: quinoxaline) |

In the drawing X represents an anion, for example, a hydroxy radical or the anion of an acid (preferably a pharmacologically acceptable acid). Examples of suitable anions are the anions of mineral acids (e.g., chloride, bromide, sulfate, nitrite and nitrate), cyanide, cyanate, etc. If no utilizable anion is present either in the fermentation medium or added with the cobalt in the second step, a hydroxy-cobalamin is initially formed (X=OH). If, however, the cell suspension to which cobalt has been added contains cyanide ion, a cyanocobalamin is recovered as the product (X=CN). Furthermore, if a particular salt is desired, the hydroxy-cobalamin can be converted to the salt by treatment with an acid. Thus, a hydroxy-cobalamin, upon treatment with hydrochloric acid, yields the chloride (X=Cl), or with hydrogen cyanide (or potassium cyanide in an acidic medium), yields the cyanide (X=CN).

To show the homogenity and activity of the cyanocobalamins formed in the examples of this invention, the following tests were conducted. For these tests the cyanocobalamin was dissolved in water to give a concentration of about 100 micrograms of cyanocobalamin per ml. of water:

TEST I

The solution of the cyanocobalamin is dried on a filter paper strip of Whatman 3 MM paper in parallel with samples of 5,6-dimethylbenzimidazole-cyanocobalamin, adenine-cyanocobalamin, 2-methyl-adenine-cyanocobalamin and Ford's Factor B [Ford et al., Biochem. Jour., 59, 86 (1955)]. The sheet is placed in an ionophoresis apparatus [similar to that described by Holdsworth in Nature, 171, 148 (1953)], and the paper is impregnated with a solution of 0.5 N acetic acid containing 0.02% KCN (w./v.). A potential of about 280 volts is applied for about 17 hours. The sheet is removed and dried. When dry (and free from odor of acetic acid), it is applied for 15 minutes to the surface of an agar plate seeded with a suspension of a vitamin $B_{12}$-requiring strain of Escherichia coli (ATCC 11105). [The agar medium contains (grams/liter): sucrose, 20 g.; citric acid, 1.2 g.; $(NH_4)_2HPO_4$, 0.4 g.; KCl, 0.08 g.; $MgCl_2 \cdot 6H_2O$, 0.418 g.; $MnCl_2 \cdot 4H_2O$, 0.036 g.; $FeCl_3 \cdot 6H_2O$, 0.023 g.; $ZnCl_2$, 0.021 g.; $CoCl_2 \cdot 6H_2O$, 0.04 g.; agar, 15 g.; triphenyl tetrazolium chloride, 1 g.] After 18 hours incubation at 37° C., the agar plate is observed. The positions of zones of growth of bacteria (noted as red zones due to the reduction of the tetrazolium dye to the colored formazan) are noted in relation to the location on the paper strip where the samples are applied. The results obtained are recorded in the examples.

TEST II

An aliquot of the solution is applied to a spot about 3 inches from the end of a strip of Whatman No. 1 filter paper parallel to spots of known cobalamins. The chromatogram is developed by the descending method using a solvent mixture containing: 77 ml. of sec.-butanol, 23 ml. of water, 0.25 ml. of KCN solution (5 gms./100 ml.) and 100 mg. of $KClO_4$ for 24 hours (at 25° C.). The strip is dried and applied to the seeded agar plate as in Test I. After incubation, the zones of growth, representing the presence of vitamins of the $B_{12}$ group (measured with reference to the movement of 5,6-dimethylbenzimidazole-cyanocobalamin), are determined.

TEST III (a) An aliquot of the solution is applied to a spot about 3 inches from the end of a strip of Whatman No. 4 filter paper parallel to spots of known cobalamins. The chromatogram is developed by the descending method using a solvent mixture containing: sec.-butanol, 100 ml.; water, 50 ml.; KCN [5% solution (w./v.)], 0.25 ml.; and $NH_4OH$ (concentrated), 1.0 ml. After 17 hours development (at 35° C.), the strips are dried and plated on seeded agar plates as in Test I. Zones of growth are determined.

(b) Same as Test IIIa with 1.0 ml. of glacial acetic acid substituted for the ammonium hydroxide.

TEST IV

An aliquot is assayed for the presence of substances stimulating the growth of Lactobacillus leichmannii (ATCC 7830) using as standard 5,6-dimethylbenzimidazole-cyanocobalamin and the method of the U.S. Pharmacopia (15th edition). A value is determined.

TEST V

An aliquot is assayed by the method of Ford and Porter [Brit. J. Nutrition, 7, 326 (1953)], using the growth response of Ochromonas malhamensis and 5,6-dimethylbenzimidazole-cyanocobalamin as standard. A value is obtained.

The following examples illustrate the invention (all temperatures being in centigrade):

Example 1

VITAMIN $B_{12}$

A medium containing 20 grams autolyzed yeast, 30 grams glucose and 1 liter of tap water is prepared, and 500-ml. aliquots are placed in 1-liter Erlenmeyer flasks. The flasks are plugged with non-absorbent cotton and autoclaved at 121° C. for 30 minutes. Approximately 10 grams of powdered calcium carbonate (previously sterilized by heating for at least 3 hours in an oven maintained at 150°) are added to each flask. When the liquid has cooled to 30°, the flasks are inoculated with 10 ml. of 2-day-old culture of Propionibacterium arabinosum ATCC 4965 (American Type Culture Collection, Washington, D.C.) grown on this medium. The flasks are then placed on a reciprocating shaker (120—1 inch cycles per minute), located in a constant temperature room maintained at 30°. After 48 hours to 74 hours of incubation, the cells, debris and calcium carbonate in the flask are collected by centrifugation. The collected solids are resuspended in a volume of distilled water equal to the original, shaken on a reciprocating shaker (280—1 inch cycles per minute) for 5 minutes and recentrifuged. The washed solids are resuspended in distilled water (equal in volume to half the original volume), the aliquots are distributed into flasks (20 ml. per 125-ml. Erlenmeyer flasks or square-base 6-oz. bottle is a convenient volume).

The pH of the suspension is about pH 6.2. Approximately 200 mg. of 5,6-dimethylbenzimidazole and cobalt nitrate [in sufficient quantity to give a concentration of 1 mg. of cobalt per liter, e.g., 5 mg. of $Co(NO_3)_2 \cdot 6H_2O$] are added to one of the series of flasks, and the flasks are placed on a reciprocating shaker (120—1 inch cycles per minute), located in a room maintained at 30°. After 20 hours agitation, the pH of the suspension rises to about 6.7. The contents of the flasks are heated at 85 to 90° C. for 20 minutes (in a boiling water bath), and the suspension is centrifuged. Approximately 0.5 ml. of an aqueous solution of KCN (5 g./100 ml.) is added to 20 ml. of the supernatant liquid. An aliquot of this supernatant liquid (hereinafter referred to as the supernatant liquid) is analyzed for the presence of substances stimulating the growth of Lactobacillus leichmannii (ATCC 7830), using as standard 5,6-dimethylbenzimidazole-cyanocobalamin and the method in the U.S. Pharmacopia (fifteenth edition) (Test IV). A value of about 0.47 mg. per liter is obtained. Another aliquot approximately 10 ml. in volume is shaken with 10 ml. of a mixture of phenol and benzene (70 parts 88% phenol—30 parts benzene). The mixture is centrifuged, and the upper layer (ca. 8 ml.) is transferred to a test tube. An equal volume of n-butanol is added to this phenol-benzene extract, and the solution is shaken briefly. Five ml. of water is then added, the mixture shaken on a reciprocating shaker for 10 minutes and then centrifuged. The bottom aqueous layer (hereinafter called the aqueous concentrate) is removed and analyzed by the following tests:

TEST I

In this test the major cobalamin present in the aqueous concentrate has a mobility equal to that of 5,6-dimethylbenzimidazole-cyanocobalamin. There is also some adenine-cyanocobalamin present. A sample of the aqueous concentrate from a cell-suspension to which cobalt has been added but which has not been supplemented with the 5,6-dimethylbenzimidazole shows only the presence of adenine-cyanocobalamin.

TEST II

In this test the major cobalamin present in the aqueous concentrate has a mobility equal to that of 5,6-dimethylbenzimidazole-cyanocobalamin. There is also a cobalamin present which has a mobility about 0.35 that of the 5,6-dimethylbenzimidazole-cyanocobalamin or equal to that of adenine-cyanocobalamin.

TEST IIIa

In this test the major cobalamin present in the aqueous concentrate has a mobility equal to that of 5,6-dimethylbenzimidazole-cyanocobalamin. There is also a cobalamin present with a mobility about 0.6 that of the 5,6-dimethylbenzimidazole-cyanocobalamin.

TEST IIIb

In this test the major cobalamin present in the aqueous concentrate has a mobility equal to that of 5,6-dimethylbenzimidazole-cyanocobalamin. There is also present a cobalamin with a mobility about 0.45 that of the 5,6-dimethylbenzimidazole-cyanocobalamin which corresponds to that obtained with adenine-cyanocobalamin.

TEST V

Another aliquot of the supernatant liquid is assayed for the presence of substances stimulating the growth of Ochromonas malhamensis, using the method of Ford and Porter [Brit. J. Nutrition, 7, 326 (1953)] with 5,6-dimethylbenzimidazole-cyanocobalamin as standard. A value of about 0.4 mg. per liter is obtained. When an aliquot of the supernatant liquid from an unsupplemented cell-suspension is assayed, a value of <0.01 mg. per liter is obtained.

Other substances which may be used instead of the 5,6-dimethylbenzimidazole in the procedure of Example 1 include: 2,3-dimethyl-5,6-diaminobenzene; 2,3-dinitro-5,6-dimethylbenzene; or 2,3-dimethyl-4-amino-5-nitrobenzene. The cell-suspension may be shaken in an atmosphere of nitrogen instead of air without affecting the biosynthesis of the cobalamin.

Example 2

VITAMIN $B_{12}$

The same procedure as used in Example 1 is used with a culture of Propionibacterium pentosaceum ATCC 4875 instead of the P. arabinosum. The supernatant liquid contains about 0.3 mg. per liter of 5,6-dimethylbenzimidazole-cyanocobalamin, as measured by either the L. leichmannii bioassay (Test IV) or the O. malhamensis bioassay (Test V). The aqueous concentrate contains 5,6-dimethylbenzimidazole-cyanocobalamin, as determined by the methods of Tests I through IIIb. When the cobalt salt is not added to the cell suspensions, no cobalamin is formed, while omission of the 5,6-dimethylbenzimidazole results in the formation of only adenine-cyanocobalamin as determined by the procedures of Tests I through IV and the lack of activity in the O. malhamensis bioassay (Test V).

Example 3

VITAMIN $B_{12}$

The procedure of Example 1 is used with the replacement of the P. arabinosum culture with P. freudenreichii ATCC 6207 and omission of the 5,6-dimethylbenzimidazole. Examination of the aqueous concentrate shows the presence of 5,6-dimethylbenzimidazole-cyanocobalamin, as determined by the procedures of Tests I to IV. When cobalt is omitted from the mixture, no cobalamin is detected in the supernatant liquid. The bioassay of the supernatant liquid is about 0.4 mg. per liter, as measured by the L. leichmannii (Test IV) and O. malhamensis (Test V) bioassays (using 5,6-dimethylbenzimidazole-cyanocobalamin as standard).

Example 4

BENZIMIDAZOLE-CYANOCOBALAMIN

The procedure described in Example 1 is used with the replacement of the 5,6-dimethylbenzimidazole with benzimidazole. The bioassay of the supernatant liquid shows about 0.5 mg. per liter of activity by the L. leichmannii assay (Test IV), 5,6-dimethylbenzimidazole-cyanocobalamin being used as standard.

The same results are obtained when o-phenylene diamine or o-dinitrobenzene is substituted for the benzimidazole.

Example 5

BENZIMIDAZOLE-CYANOCOBALAMIN

The procedure described in Example 2 is used with the replacement of the 5,6-dimethylbenzimidazole with benzimidazole. The bioassay of the supernatant liquid shows about 0.5 mg. per liter of activity by the L. leichmannii assay (Test IV). Analysis of the aqueous concentrate shows the presence of benzimidazole-cyanocobalamin, as described in Example 4.

Example 6

5-TRIFLUOROMETHYLBENZIMIDAZOLE-CYANOCOBALAMIN

The procedure used in Example 1 is used with the replacement of the 5,6-dimethylbenzimidazole with $\alpha,\alpha,\alpha$-trifluoromethyl-2-nitro-p-toluidine. The bioassay of the supernatant liquid shows about 0.4 mg. per liter of activity by the L. leichmannii assay (Test IV), 5,6-dimethylbenzimidazole-cyanocobalamin being used as a standard. Analysis of the aqueous concentrate by the procedure of Test I shows the presence of a neutral cobalamin (ionophoretically). Analysis of the aqueous concentrate by Test II shows a cobalamin with a mobility of about 0.95 that of the 5,6-dimethylbenzimidazole-cyanocobalamin, and the same result is obtained when analysis is made of the aqueous concentrate by the procedures of Tests IIIa and IIIb. When 3,4-diamino-$\alpha,\alpha,\alpha$-trifluoromethyltoluene is substituted for the trifluoro-2-nitro-p-toluidine, the same results are obtained.

Example 7

5-TRIFLUOROMETHYLBENZIMIDAZOLE-CYANO-COBALAMIN

The procedure described in Example 2 is used with the replacement of the 5,6-dimethylbenzimidazole with $\alpha,\alpha,\alpha$-trifluoro-2-nitro-p-toluidine. The bioassay of the supernatant liquid is about 0.49 mg. per liter, as measured by the *L. leichmannii* bioassay (Test IV) using 5,6-dimethylbenzimidazole-cyanocobalamin as standard. Analysis of the aqueous concentrate by the procedures of Tests I to IIIb gives the same results described in Example 6.

Example 8

5-METHYLBENZIMIDAZOLE-CYANOCOBALAMIN

By replacing the 5,6-dimethylbenzimidazole in Example 1 with 5-methylbenzimidazole, there is obtained 5-methylbenzimidazole-cyanocobalamin.

Example 9

QUINOXALINE-CYANOCOBALAMIN

The procedure used in Example 1 is used with the replacement of 5,6-dimethylbenzimidazole with quinoxaline hydrochloride to yield quinoxaline-cyanocobalamin.

Example 10

BENZOTRIAZOLE-CYANOCOBALAMIN

The procedure of Example 1 is used with the replacement of 5,6-dimethylbenzimidazole with benzotriazole. The bioassay of the supernatant liquid is 0.9 mg. per liter as measured by the *L. leichmannii* method (Test IV) and 0.3 mg. per liter as measured by the *O. malhamensis* bioassay (Test V), using 5,6-dimethylbenzimidazole-cyanocobalamin as a standard. Analysis of the aqueous concentrate by the procedure of Test I shows the presence of an ionophoretically neutral cobalamin. Analysis of the aqueous concentrate by the procedure of Test II shows the presence of a cobalamin with a mobility of 1.05 that of 5,6-dimethylbenzimidazole-cyanocobalamin, while when the procedure of Test IIIb is used, the new cobalamin has a mobility equal to that of 5,6-dimethylbenzimidazole-cyanocobalamin. When the procedure of Test IIIa is used, the new cobalamin has a mobility of about 0.3 that of 5,6-dimethylbenzimidazole-cyanocobalamin.

Example 11

PHENOTHIAZINE-CYANOCOBALAMIN

The procedure of Example 1 is used with the replacement of the 5,6-dimethylbenzimidazole with phenothiazine. The supernatant liquid has an activity of about 0.4 mg. per liter as measured by the bioassay based on the growth response of *L. leichmannii* (Test IV) (with 5,6-dimethylbenzimidazole-cyanocobalamin as standard). When the aqueous concentrate is examined by the procedure of Test I, an ionophoretically neutral substance is found. When the procedure of Test II is used, the new cobalamin has a mobility of about 0.46 that of 5,6-dimethylbenzimidazole-cyanocobalamin.

Example 12

PHENOTHIAZINE-CYANOCOBALAMIN

The procedure of Example 2 is used with the replacement of the 5,6-dimethylbenzimidazole with phenothiazine. The supernatant liquid has an activity of about 0.4 mg. per liter as measured by the bioassay based on the growth response of *L. leichmannii* (with 5,6-dimethylbenzimidazole-cyanocobalamin as standard). The aqueous concentrate contains the same cobalamin described in Example 11.

Example 13

VITAMIN $B_{12}$

A medium containing 5 grams of meat extract, 10 grams peptone (Bacto) and 10 grams glucose is diluted to one liter with distilled water. Seventy-five ml. aliquots are distributed into 250-ml. Erlenmeyer flasks and autoclaved for 20 minutes at 126° C. When cooled to 30° C., the flasks are inoculated with *Streptomyces aureofaciens* (NRRL 2209) and placed on a rotary shaker located in room maintained at 25° C. After 2 days, 1 ml. of the growth is used to inoculate the same medium in a second flask, and the inoculated flask is placed on the shaker. After 2 days incubation, the cells are collected by centrifugation and resuspended in distilled water. The centrifugation is repeated and the cells resuspended in a second volume of distilled water. (The dry weight of the cells is about 4.5 mg. per ml. of suspension.) Aliquots of the suspension are distributed into flasks (20 ml. per 125-ml. Erlenmeyer flask is a convenient volume), and cobalt nitrate solution is added to give a final concentration of about 1 mg. of cobalt per liter. The flasks are placed on a reciprocating shaker located in a room maintained at 30° C. for about 18 hours. At the end of this interval, the pH is adjusted to about 2.5 by the addition of 12 N sulfuric acid; and the suspension is shaken and then centrifuged (this releases the cobalamins). The supernatant liquid is neutralized to about pH 7.5 by the addition of solid $NaHCO_3$; 0.5 ml. of a 5% solution of KCN is added and assayed for cobalamin content using the bioassay based on the growth response of *L. leichmannii* (Test IV), with 5,6-dimethylbenzimidazole-cyanocobalamin as standard. Approximately 0.3 mg. per liter are found. When the supernatant liquid is extracted by the phenol-benzene solvent, as described in Example 1, and the aqueous concentrate is prepared, the latter is found to contain 5,6-dimethylbenzimidazole-cyanocobalamin by the procedures of Tests I to III.

Example 14

VITAMIN $B_{12}$

The procedure of Example 13 is used except that sufficient cobalt nitrate is added to the cellular suspension to give a level of 100 mg. per liter of cobalt instead of the 1 mg. per liter. The supernatant liquid prepared as in Example 13 is found to contain about 0.35 mg. per liter of vitamin $B_{12}$ activity.

Example 15

VITAMIN $B_{12}$ 17.8 liters of a medium containing (per liter): glucose, 51 grams; autolyzed yeast, 34 grams; tap water, 1 liter; are placed in a stainless-steel fermentation unit of 38 liters capacity, heated at 121° C. for 30 minutes by injection of steam and cooled to 30° C. (final volume 28 liters). About 2,000 ml. of a slurry of $CaCO_3$ (containing 600 g. of $CaCO_3$), sterilized by autoclaving is then added, together with 1 liter of *Propionibacterium freudenreichii* ATCC 6207 culture grown on this medium for 48 hours in flasks shaken on a reciprocating shaker (120—1 inch strokes per minute), located in a constant temperature room. Maintained at 30° C., the culture is allowed to grow in the medium under virtually anaerobic conditions while being agitated with a turbine mixer rotating at 87 r.p.m. After 18 hours incubation at 30° C., concentrated ammonium hydroxide is added to adjust the pH from 5.7 to 6.0. After a total of 42 hours incubation when the pH is 5.2, the fermented medium is passed through a Sharples Super Centrifuge. The collected solids are resuspended in 3 liters of distilled water, and the suspension is added to 17 liters of water in the stainless-steel fermentation unit. Approximately 200 mg. of cobalt nitrate hexahydrate are added and the cell suspension agitated in the presence of air. Samples are removed periodically and treated as described in Example 1 and analyzed by the methods given in Example 1 (Tests I–IV). The following results are obtained:

| Length of incubation period (hours) | Cobalamin content,[2] mg./l. | pH | Identity of cobalamin by Tests I to III |
|---|---|---|---|
| 0 [1] | 0.01 | 6.3 | 5,6-Dimethylbenzimidazole-cyanocobalamin. |
| 0 | 0.01 | 6.3 | Do. |
| 2 | 0.53 | 6.35 | Do. |
| 4 | 1.05 | 6.65 | Do. |
| 8 | 1.1 | 6.7 | Do. |
| 12 | 1.2 | 6.5 | Do. |
| 16 | 1.0 | 6.4 | Do. |
| 20 | 1.2 | 6.65 | Do. |

[1] Before addition of the cobalt nitrate.
[2] As determined by stimulation of the growth of *Lactobacillus leichmannii* (Test IV) as described in Example 1 with 5,6-dimethylbenzimidazole-cyanocobalamin as standard.

*Example 16*

VITAMIN $B_{12}$

The procedure of Example 15 is used with the addition of cobalt nitrate in sufficient quantity to give a concentration of 100 mg. of cobalt per liter of medium instead of the lower level. Examination of the aqueous concentrates by the procedures of Tests I to III shows the presence of 5,6-dimethylbenzimidazole-cyanocobalamin. The bioassay of the supernatant liquid is about 1.0 mg. per liter as measured by the *L. leichmannii* bioassay (Test IV).

The cyanocobalamins formed in each of the examples can be converted to the corresponding hydroxocobalamin derivatives by treatment of the former with hydrogen in the presence of platinum oxide in an aqueous medium. The hydroxocobalamins thus formed can then be converted to any desired salt by treatment with the appropriate acid in an aqueous medium.

The vitamin $B_{12}$ and other biologically active cobalamins formed in each of the examples can be used in lieu of otherwise-produced vitamin $B_{12}$ in promoting growth of chicks. For this purpose, the cobalamin-containing supernate may be merely dried, to provide a cobalamin concentrate; or the cobalamin may be recovered from the supernate or dried concentrate by use of conventional vitamin $B_{12}$ purification expedients. The dosage employed (e.g., when added as a supplement to chick feeds) would depend on the potency of the concentrate, or potency of the isolated non-$B_{12}$ cobalamin, relative to pure vitamin $B_{12}$.

The invention may be otherwise variously embodied within the scope of the appended claims.

What is claimed is:

1. A process for preparing a physiologically active cobalamin, which comprises culturing a vitamin $B_{12}$-producing microorganism in a cobalt-deficient nutrient medium, separating the cells from the medium, treating the separated cells with a utilizable source of cobalt, aerating the thus-treated cells and recovering the resulting physiologically active cobalamin.

2. The process of claim 1, wherein the utilizable source of cobalt is an inorganic cobalt salt.

3. The process of claim 1, wherein the microorganism is of the genus Propionibacterium.

4. The process of claim 1, wherein the microorganism is *Streptomyces aureofaciens*.

5. The process of claim 1, wherein the microorganism is *Propionibacterium freudenreichii*.

6. A process for preparing a physiologically active cobalamin, which comprises culturing an added precursor-requiring vitamin $B_{12}$-producing microorganism in a cobalt-deficient nutrient medium, separating the cells from the medium, treating the separated cells with a utilizable source of cobalt, aerating the thus-treated cells and recovering the resulting physiologically active cobalamin.

7. The process of claim 6, wherein the nutrient medium is substantially free of precursor and a precursor is added to the separated cells.

8. The process of claim 6, wherein a precursor is added to the nutrient medium.

9. The process of claim 6, wherein the microorganism is of the genus Propionibacterium.

10. The process of claim 9, wherein 5,6-dimethylbenzimidazole is added as a precursor and a 5,6-dimethylbenzimidazole-cobalamin is recovered.

11. The process of claim 9, wherein 5-methylbenzimidazole is added as a precursor and 5-methylbenzimidazole-cobalamin is recovered.

12. The process of claim 9, wherein benzimidazole is added as a precursor and benzimidazole-cobalamin is recovered.

13. The process of claim 9 wherein the microorganism is *Propionibacterium arabinosum*.

14. The process of claim 9 wherein the microorganism is *Propionibacterium pentosaceum*.

References Cited in the file of this patent

UNITED STATES PATENTS

| 2,530,416 | Wolf et al. | Nov. 21, 1950 |
| 2,595,499 | Wood et al. | May 6, 1952 |
| 2,643,213 | Hall | June 23, 1953 |
| 2,650,896 | McDaniel | Sept. 1, 1953 |
| 2,683,681 | McCormick | July 13, 1954 |
| 2,715,602 | Hargrove | Aug. 16, 1955 |
| 2,796,383 | Robinson | June 18, 1957 |
| 2,809,148 | Bernhauer et al. | Oct. 8, 1957 |
| 2,842,540 | Perlman | July 8, 1958 |
| 2,872,444 | Perlman | Feb. 3, 1959 |
| 2,893,988 | Bernhauer et al. | July 7, 1959 |

FOREIGN PATENTS

| 948,734 | Germany | Mar. 8, 1956 |

OTHER REFERENCES

Germany, A 19,703 IV a/30h, Mar. 8, 1956.

Darken: The Botanical Review, vol. 19, No. 2, February 1953, pp. 90–130.